(12) United States Patent
Franklin (10) Patent No.: US 11,838,057 B2
(45) Date of Patent: Dec. 5, 2023

(54) OPTICAL COMMUNICATION USING DOUBLE SIDEBAND SUPPRESSED CARRIER MODULATION

(71) Applicant: The Boeing Company, Chicago, IL (US)

(72) Inventor: James D. Franklin, Manhattan Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/555,343

(22) Filed: Dec. 17, 2021

(65) Prior Publication Data

US 2023/0198624 A1 Jun. 22, 2023

(51) Int. Cl.
| | |
|---|---|
| H04B 10/516 | (2013.01) |
| H04B 10/2507 | (2013.01) |
| H04B 10/54 | (2013.01) |
| H04B 10/556 | (2013.01) |

(52) U.S. Cl.
CPC ... *H04B 10/5165* (2013.01); *H04B 10/25073* (2013.01); *H04B 10/54* (2013.01); *H04B 10/5561* (2013.01)

(58) Field of Classification Search
CPC .......... H04B 10/5165; H04B 10/25073; H04B 10/54; H04B 10/5561
USPC .......................................................... 398/183
See application file for complete search history.

(56) References Cited

U.S. PATENT DOCUMENTS

| | | | |
|---|---|---|---|
| 4,780,884 A | 10/1988 | Karabinis | |
| 6,115,162 A | 9/2000 | Graves et al. | |
| 6,507,405 B1 * | 1/2003 | Grek | G01B 9/02022 356/497 |
| 6,850,713 B2 | 2/2005 | Kikuchi et al. | |
| 7,239,763 B2 | 7/2007 | Kawanishi et al. | |
| 8,103,175 B1 * | 1/2012 | Kowalczyk | H04B 10/25759 398/115 |
| 9,853,733 B2 | 12/2017 | Stiffler et al. | |
| 2001/0035996 A1 | 11/2001 | Havstad et al. | |
| 2005/0286908 A1 * | 12/2005 | Way | H04B 10/5165 398/186 |
| 2011/0234435 A1 * | 9/2011 | Woodward | G02F 7/00 341/137 |

(Continued)

FOREIGN PATENT DOCUMENTS

CN 104980223 A * 10/2015

OTHER PUBLICATIONS

Kanno et al., "Modulator Bias Optimization of a High Extinction-ratio Optical Mach-Zehnder Intensity Modulator for Linear-cell Radar Systems", 2017 Progress in Electromagnetics Research Symposium—Fall (PIERS—Fall), Singapore, Nov. 19-22, pp. 1166-1171.

(Continued)

*Primary Examiner* — Abbas H Alagheband (74) *Attorney, Agent, or Firm* — Sage Patent Group (57) ABSTRACT

A method for operating an optical modulator includes receiving a narrowband radio frequency ("RF") signal. The method further including, responsive to receiving the narrowband RF signal, modulating the narrowband RF signal using a double sideband suppressed carrier ("DSBSC") modulation scheme to generate a DSBSC optical signal. The method further including transmitting the DSBSC optical signal to an optical transmitter.

20 Claims, 7 Drawing Sheets

(56) References Cited

U.S. PATENT DOCUMENTS

| | | | |
|---|---|---|---|
| 2014/0022119 A1 | 1/2014 | Lohr et al. | |
| 2014/0306101 A1* | 10/2014 | Zornoza Indart | G01D 5/35364 |
| | | | 250/227.14 |
| 2015/0029053 A1* | 1/2015 | Dewberry | G01S 11/02 |
| | | | 342/118 |
| 2016/0142148 A1* | 5/2016 | Marpaung | H01S 3/0078 |
| | | | 398/183 |
| 2017/0222721 A1* | 8/2017 | Dailey | H04B 10/25752 |
| 2021/0194583 A1* | 6/2021 | Maho | H04B 10/118 |

OTHER PUBLICATIONS

Sakamoto et al., "Optoelectronic Oscillator Using Push-Pull Mach-Zehnder Modulator Biased at Null Point for Optical Two-Tone Signal Generation", 2005 Conference on Lasers & electro-Optics (CLEO), pp. 877-879.

\* cited by examiner

OPTICAL COMMUNICATION USING DOUBLE SIDEBAND SUPPRESSED CARRIER MODULATION

FIELD

The present disclosure is related to optical communication. In particular, the present disclosure relates to optical communication using double sideband suppressed carrier modulation.

BACKGROUND

A laser communication ("lasercom") system can be a wireless communication system that establishes a laser link (or an optical communication channel) between an optical transmitter and an optical receiver. In some examples, one or both of the optical transmitter and the optical receiver are on satellites in earth orbit. A laser link can include an optical upconverter and downconverter similar to a standard transponder, where a signal is upconverted, transmitted, received, and downconverted.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

In some embodiments, a method of operating an optical modulator is provided. The method includes receiving a narrowband radio frequency ("RF") signal. The method further includes, responsive to receiving the narrowband RF signal, modulating the narrowband RF signal using a double sideband suppressed carrier ("DSBSC") modulation scheme to generate a DSBSC optical signal. The method further includes transmitting the DSBSC optical signal to an optical transmitter.

In other embodiments, a method of operating an optical demodulator is provided. The method includes receiving a double sideband suppressed carrier ("DSBSC") optical signal. The method can further include passing the DSBSC optical signal through a Costas loop circuit. The method can further include outputting a radio frequency ("RF") signal from a quadrature port of the Costas loop circuit.

In other embodiments, an optical modulator is provided. The optical modulator includes an input port; circuitry; and an output port. The input port can be configured to receive a narrowband radio frequency ("RF") signal. The circuitry can be configured to modulate the narrowband RF signal using a double sideband suppressed carrier ("DSBSC") modulation scheme to generate a DSBSC optical signal. The output port can be configured to output the DSBSC optical signal.

In other embodiments, an optical demodulator is provided. The optical demodulator includes an input port; a Costas loop circuit; and an output port. The input port can be configured to receive a double sideband suppressed carrier ("DSBSC") optical signal. The Costas loop circuit can have an input coupled to the input port and an output coupled to the output port, the Costas loop circuit configured to demodulate the DSBSC optical signal to generate a radio frequency ("RF") signal. The output port can be coupled to a quadrature port of the Costas loop circuit and configured to output the RF signal.

The features and functions can be achieved independently in various embodiments of the subject disclosure or may be combined in yet other embodiments in which further details can be seen with reference to the following description and drawings.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

In the field of optical communications systems, digital modulators and optical Costas loop intradyne receivers can be used for optical fiber transmission and now the nascent field of free space optical communications, sometimes referred to as lasercom. An offshoot optical field is known as RF photonics, which when used for communications purposes will place a radio frequency signal on an optical carrier for remote transmission of a signal.

A coherent low data rate laser communication ("lasercom") system between satellites can be limited by laser phase noise. Because the laser may be necessary to track Doppler frequency shift a standard DFB laser with high phase noise may be necessary. Various embodiments described herein produce reduced phase noise flaring by using a double sideband suppressed carrier ("DSBSC") and then suppressing. In some embodiments, a portion of the optical hardware can be performed in the electrical domain, which can improve the technology readiness level ("TRL") of the optical communication system. In additional or alternative embodiments, more analog hardware and lower drive requirements can improve DC power requirements.

Figure 1:
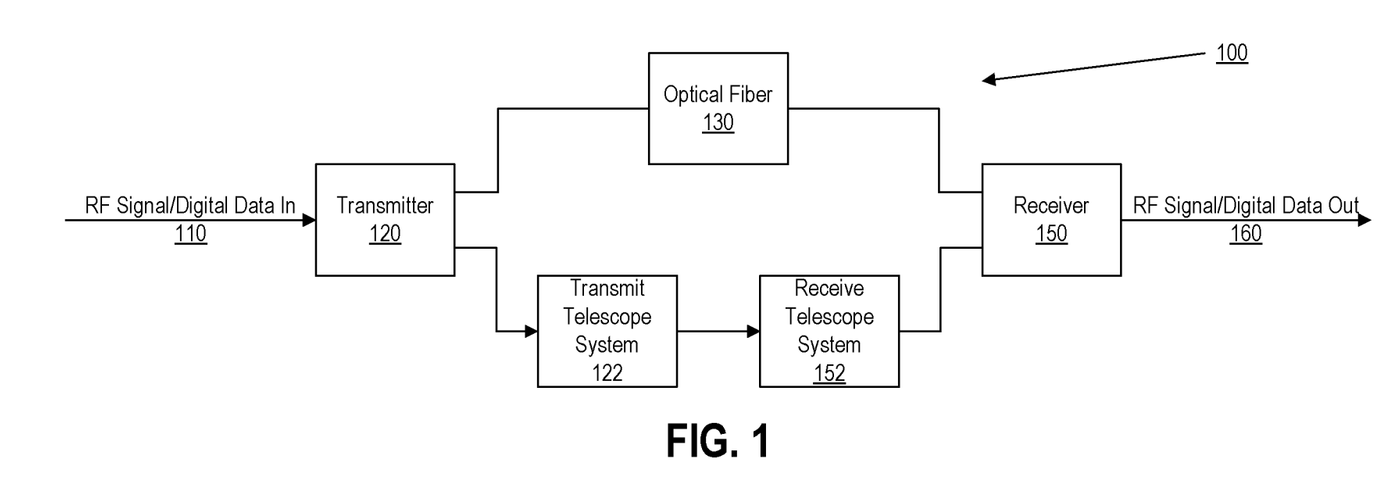
FIG. 1 is a block diagram illustrating an example of a system for communicating optical double sideband suppressed carrier ("DSBSC") signals according to some embodiments.

FIG. 1 is a block diagram of an example of a system 100 for optical communication using DSBSC modulation. The system 100 includes a transmitter 120, optical fiber 130, transmit telescope system 122, receive telescope system 152, and receiver 150. In some examples, a system may include only the optical fiber 130 or the transmit telescope system 122 and receive telescope system 152. The transmitter 120 receives an input signal 110 (e.g., either an RF signal or digital data input) and transmits a signal based on the input signal 110 to the receiver 150 via the optical fiber 130 or the transmit telescope system 122 and receive telescope system 152. The receiver 150 can provide an output signal 160 (e.g., a RF signal or digital data output) based on the signal received from the transmitter 120.

In some embodiments, an analog DSBSC demodulator is used to provide very low phase noise, that when coupled with the reduced carrier in the analog DSBSC modulator, increases the signal over the noise. The demodulator is similar in that it can cancel some of the phase noise using DSBSC. In some examples, the demodulator includes a RF Costas loop.

Various embodiments herein describe obtaining an improved high sensitivity optical communications system by combining aspects from RF photonics and state of the art optical communications systems. In the communication system transmitter, instead of using just an optical carrier for a signal, a double sideband suppressed carrier ("DSBSC") is used as a subcarrier for an analog or digital modulated RF carrier wave. A typical DSBSC signal can be generated by suppressing the carrier of an amplitude modulated (AM) signal, giving the DSBSC subcarrier signal upper and lower sidebands, which are 0 degrees or in-phase. In some embodiments, a DSBSC signal is generated by suppressing the carrier of a phase modulated (PM) signal, giving the DSBSC subcarrier signal upper and lower sidebands, which are 180 degrees out-of-phase. This approach may require a low modulation index which minimizes the required modulator drive power. In the communication system receiver, a Costas loop can be used to recover the RF carrier wave from the DSBSC subcarrier signal. If the DSBSC signal is AM generated, the RF carrier is recovered from the Costas loop I or in-phase port and if the DSBSC signal is PM generated, the RF carrier is recovered from the Costas loop Q or quadrature port.

Figure 2:
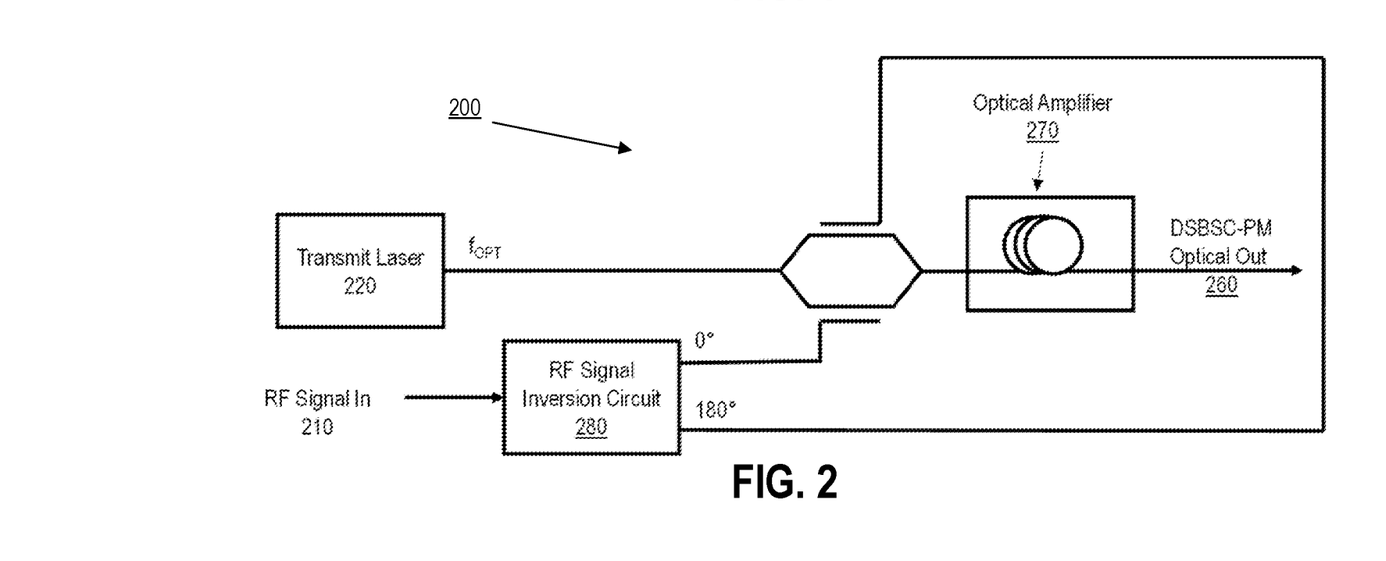
FIG. 2 is a block diagram illustrating an example of an optical DSBSC modulator according to some embodiments.

FIG. 2 illustrates an example of a DSBSC modulator 200 (which may be included in a transmitter, for example, transmitter 120 of FIG. 1) according to some embodiments. The DSBSC modulator 200 includes a transmit laser 220, RF signal inversion circuit 280, and optical amplifier 270 that allow the DSBSC modulator 200 to generate a DSBSC-PM optical signal 260 from a RF signal 210.

Figure 3A:
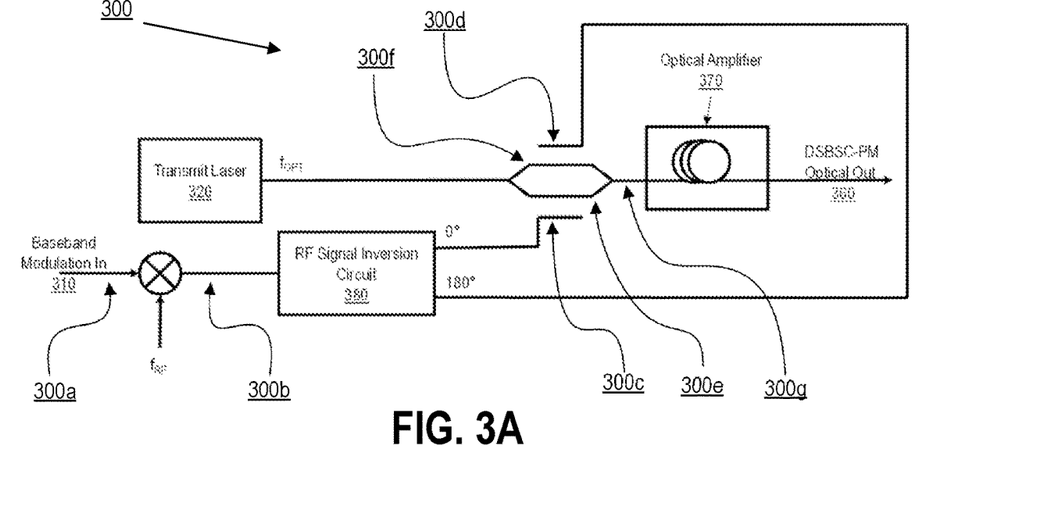
FIGS. 3A-G are diagrams illustrating an example of another optical DSBSC modulator and a signal at different points during modulation by the DSBSC modulator according to some embodiments.

FIG. 3A illustrates an example of a DSBSC modulator 300 (which may be included in a transmitter, for example, transmitter 120 of FIG. 1) according to some embodiments. Similarly to FIG. 2, the DSBSC modulator 300 includes a transmit laser 320, RF signal inversion circuit 380, and optical amplifier 370. However, in this example, a baseband modulation signal 310 is used to generate a DSBSC-PM optical signal 360.

Figure 3B:
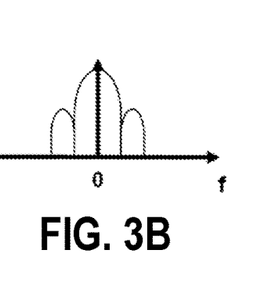
Figure 3C:
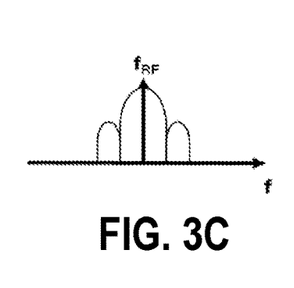
Figure 3D:
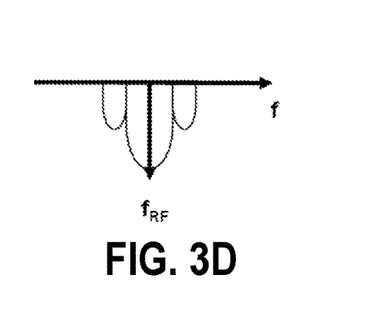
Figure 3E:
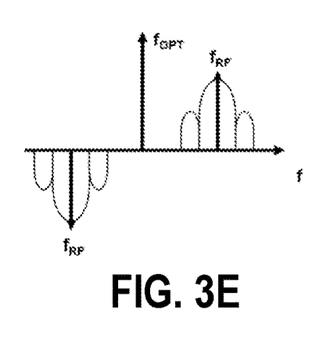
Figure 3F:
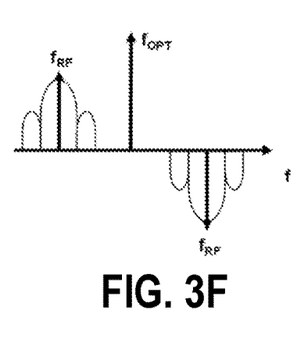
Figure 3G:
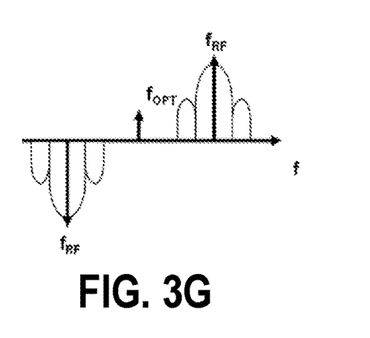

FIGS. 3B-G illustrate examples of a signal passing through the DSBSC modulator 300 at different points. FIG. 3B is an example of a signal at point 300a of FIG. 3A. FIG. 3C is an example of a signal at points 300b-c of FIG. 3A. FIG. 3D is an example of a signal at point 300d of FIG. 3A. FIG. 3E is an example of a signal at point 300e of FIG. 3A. FIG. 3F is an example of a signal at point 300f of FIG. 3A. FIG. 3G is an example of a signal at point 300g of FIG. 3A.

Figure 4:
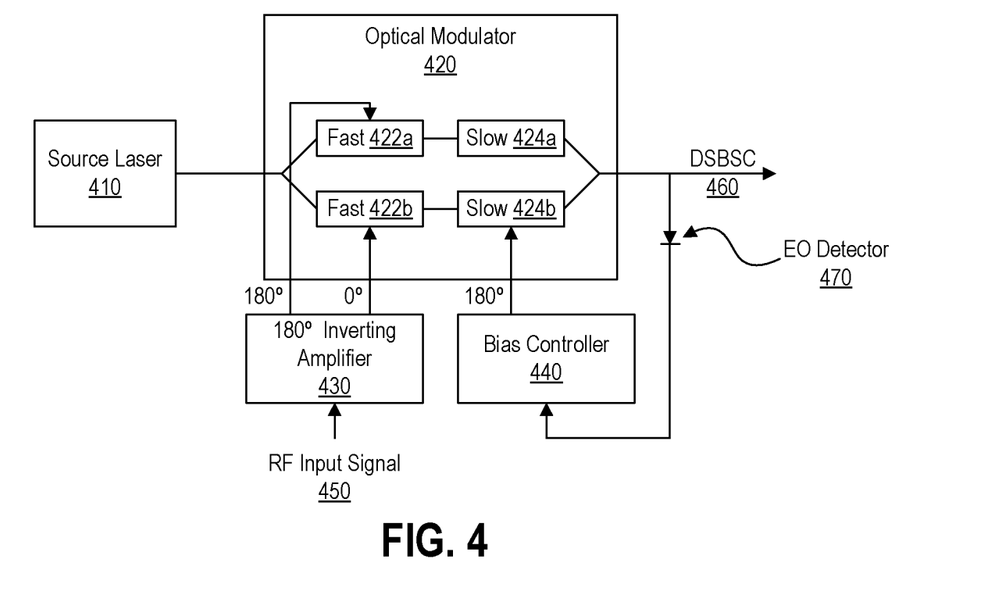
FIG. 4 is a block diagram illustrating an example of another optical DSBSC modulator according to some embodiments.

FIG. 4 illustrates an example of DSBSC modulator 420 (which may be included in a transmitter, for example, transmitter 120 of FIG. 1) according to some embodiments. The optical modulator 420 includes a first fast phase arm 422a, a second fast phase arm 422b, a first slow phase arm 424a, and a second slow phase arm 424b. A source laser 410 is coupled (e.g., electrically connected) to an input of the first fast phase arm 422a and the second fast phase arm 422b. The source laser 410 can provide an optical signal that can serve as a carrier for a RF input signal 450.

The RF input signal 450 can be provided by an RF modulator and input to a 180 degree inverting amplifier 430, which can generate a 0 degree phase shifted version of the RF signal and a 480 degree phase shifted version of the RF signal. In some embodiments, the RF signal is a narrowband phase modulated ("PM") RF signal. In additional or alternative embodiments, the RF signal is a narrowband amplitude modulated ("AM") RF signal. The 180 degree amplifier 430 is coupled to an input of the first fast phase arm 422a and the second fast phase arm 422b such that the 180 degree phase shifted version of the RF signal is provided to the first fast phase arm 422a and the 0 degree phase shifted version of the RF signal is provided to the second fast phase arm 422b. As a result, the first fast phase arm 422a is 180 degrees out of phase with the second fast phase arm 422b, which can allow them to be added when combined at the output of the optical modulator 420.

An output of the first fast phase arm 422a is coupled to an input of the first slow phase arm 424a and an output of the second fast phase arm 422b is coupled to an input of the second slow phase arm 424b. An output of the first slow phase arm 424a and an output of the second slow phase arm 424b can be coupled together to form an output of the optical modulator 420. The output of the optical modulator 420 can be fed back through an electro/optical ("EO") detector 470 to a bias controller 440, which can generate a 180 degree phase shifted output. The bias controller 440 can be coupled to an input of the second slow phase arm 424 such that the 180 degree phase shifted output of the bias controller 440 in input to the second slow phase arm 424b. Feeding back the output to the second slow phase arm 424b through the bias controller can set one arm of the optical modulator to be 180 degrees out of phase with the other arm, which cancel out the carrier signal.

The output of the of optical modulator 420 can also be considered the DSBSC optical signal 460, which may be provided transmitted to a receiver (e.g., receiver 150 of FIG. 1) via an optical fiber (e.g., optical fiber 130 of FIG. 1) or an optical telescope system (e.g., the transmit telescope system 122 and receive telescope system 152 of FIG. 1).

Although the optical modulator 420 is illustrated in FIG. 4 as independent of the source laser 410, 180 degree inverting amplifier 430, bias controller 440, and EO detector 470, in some examples, the optical modulator 420 can include one or more of the source laser 410, 180 degree inverting amplifier 430, bias controller 440, and EO detector 470. In this embodiment, the optical modulator 420 is depicted as a Mach-Zehnder modulator, however, any suitable optical modulator may be implemented.

In some embodiments, the optical modulator can operate similarly to pulse carvers used in a transformational satellite communication system ("TSAT") design, but the phase excursions can be small and bipolar.

Figure 5A:
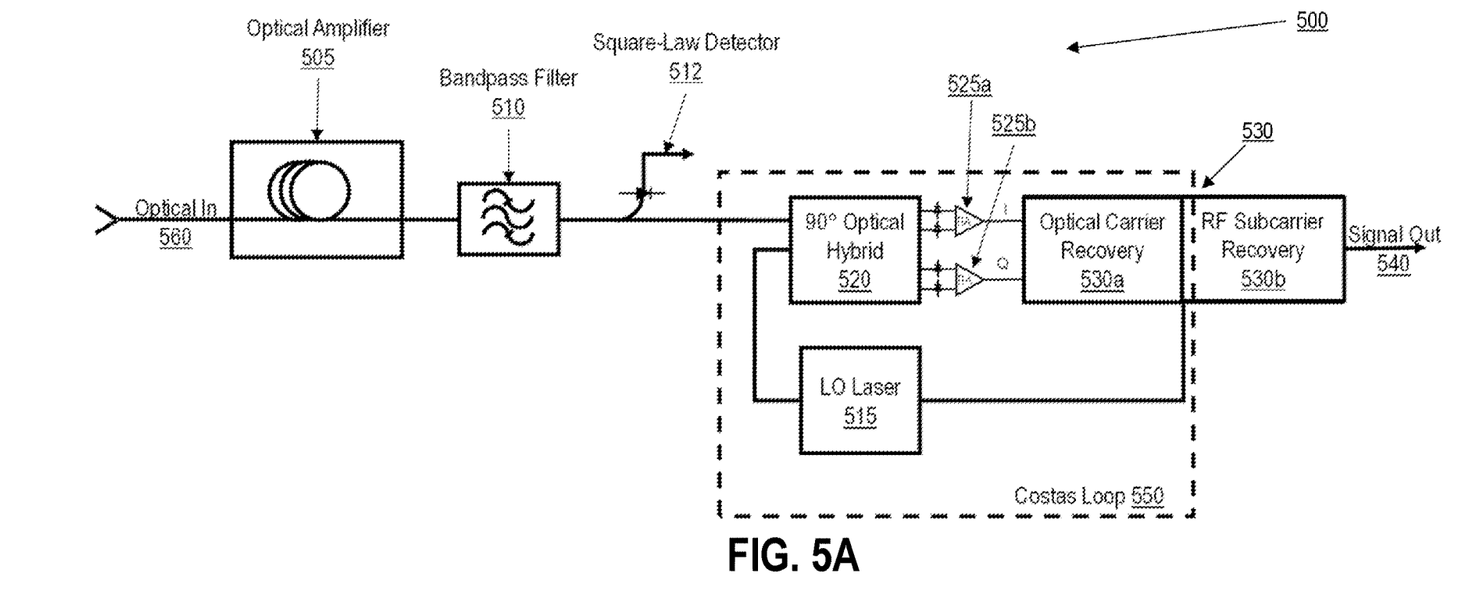
FIGS. 5A-E are diagrams illustrating an example of a DSBSC demodulator and a signal at different points during demodulation by the DSBSC demodulator according to some embodiments.

FIG. 5A is a block diagram of an example of a DSBSC demodulator 500 (which may be included in a receiver, for example, receiver 150 of FIG. 1). The DSBSC demodulator 500 can include an optical amplifier 505, bandpass filter 510, square-law detector 512, RF electronic circuitry 530, and a Costas loop 550. In this example, the Costas loop 550 includes a laser diode 515, a 90 degree optical hybrid 520, TIAs 525a-b, and a portion of the RF electronic circuitry 530 (optical carrier recovery 530a). In some examples, the optical amplifier 505 can include an erbium doped fiber amplifier ("EDFA") 305.

Figure 5B:
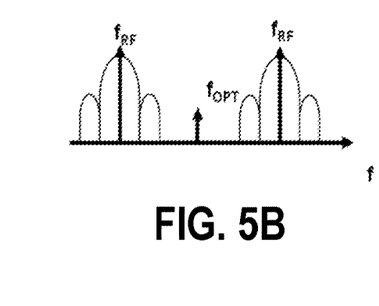
Figure 5C:
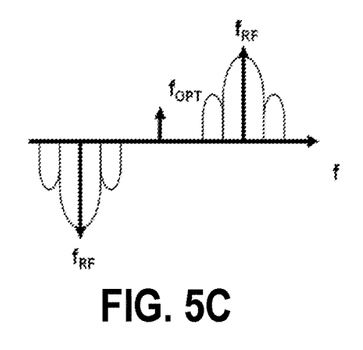
Figure 5D:
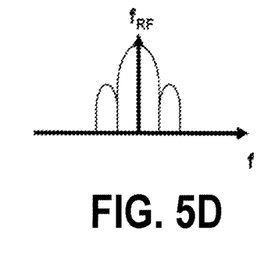
Figure 5E:
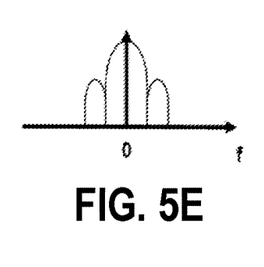

FIGS. 5B-E illustrate examples of a signal as it passes from through the DSBSC demodulator 500. In some embodiments, a DSBSC optical signal 560 is provided to the optical amplifier 505 (e.g., as illustrated in FIG. 5B), which can be used to overcome input losses and improve detection efficiency. An output of the optical amplifier 305 can be provided to the bandpass filter 510 (e.g., a 20 nm/2500 GHz filter), which can be used to clean up high gain wavelengths of the optical amplifier 505. The output of the bandpass filter 510 can be provided to the square-law detector 512, which can be used for high dynamic range signals (an example of which is illustrated in FIG. 5C). The local oscillator ("LO") laser 515 can include a distributed feedback laser. The detected signals from the TIAs 525a-b are the I and Q signals (e.g., as illustrated in FIG. 5D) that are input to the RF electronic circuitry 530. The RF electronics 530 can include optical carrier recovery 530a and RF subcarrier recovery 530b, which can output the signal 540 (e.g., a demodulated RF signal), an example of which is illustrated in FIG. 5E.

In some embodiments, a low data rate design can be used for low data rates (e.g., less than 50 Mbps). For example, the optical hybrid can be replaced with a 3 dB coupler followed by a balanced detector. A RF Costas loop operating at 500 MHz can demodulate the DSBSC optical signal. A RF gain control can be used instead of an optical gain control. An RF tracking circuit can be used for pointing control from a tracking beacon generated from the DSBSC signal. The modulator and demodulator can include low speed digital hardware with a 60 MHz passband and a center frequency of 100 MHz.

Figure 6:
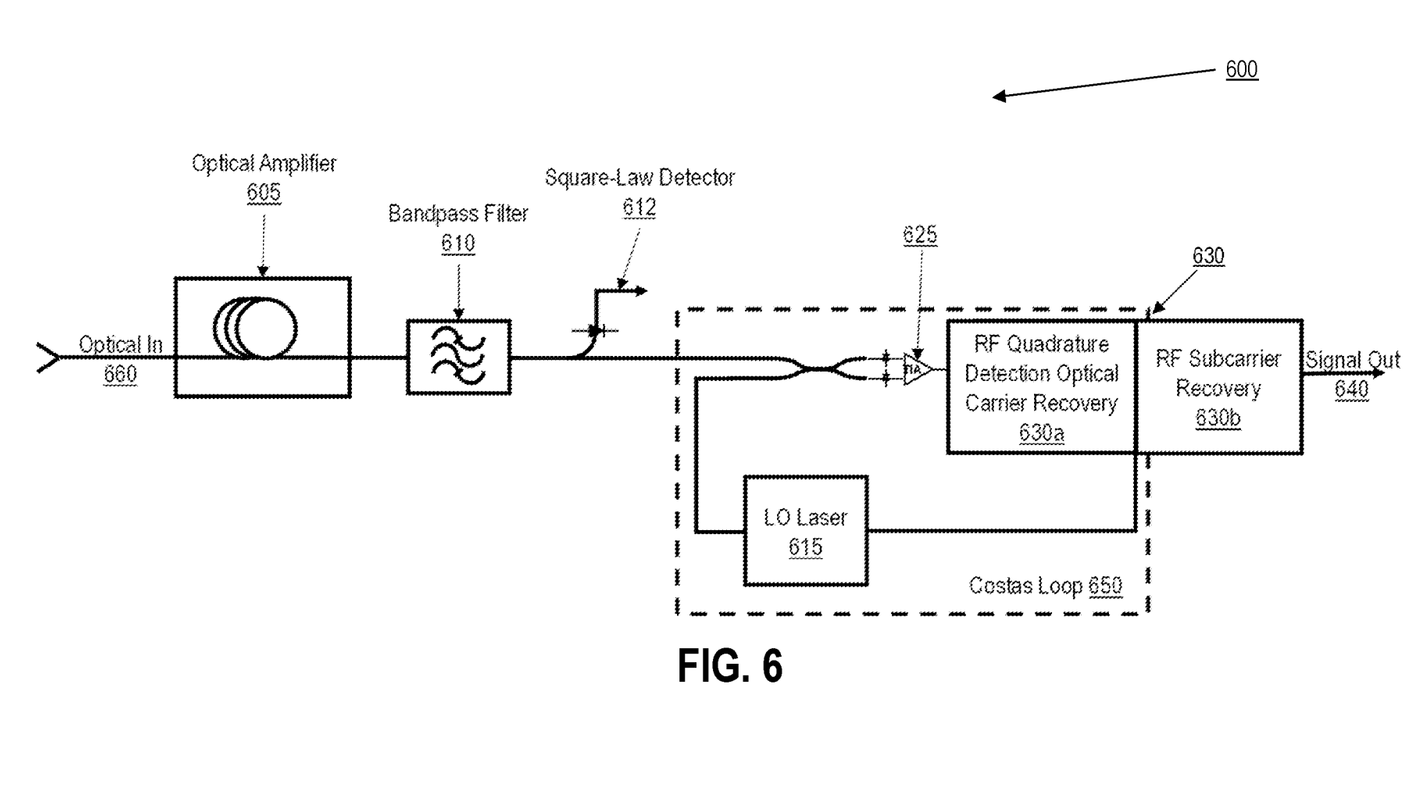
FIG. 6 is a block diagram illustrating an example of another DSBSC demodulator according to some embodiments.

FIG. 6 illustrates an example of DSBSC demodulator 600 (which can be included in a receiver, for example, receiver 150 of FIG. 1). Similarly to FIG. 5, the DSBSC demodulator 600 can include an optical amplifier 605, bandpass filter 610, square-law detector 612, RF electronic circuitry 630, and a Costas loop 650. However, the RF electronic circuitry 630 includes a RF quadrature detection optical carrier recovery 630a and a RF subcarrier recovery 630b, which can allow the Costas loop 650 to include a single TIA 625 and LO laser 615.

By using the above described signaling approach, in some embodiments, the optical bandwidth will double but there are improvements of many operational benefits, especially for low data rate signals that require high sensitivity. With the use of simple square-law detection, the DSBSC signal provides signal synchronization and beacon tracking capability for free space communications systems. Because of the Costas loop noise cancelling effect, the approach describe herein also has the same signal-to-noise ratio (SNR) as a standard heterodyne optical communications system or any single sideband suppressed carrier (SSBSC) system. The RF signal that modulates the DSBSC modulator can be any analog, as well as digital signal. By carefully selecting a digital signal format, the performance of the system can be enhanced. Such enhancing modulation formats, would include, but not limited to, BPSK, QPSK, MSK and FSK. The Costas loop will convert the transmit and receive laser phase noise into an amplitude fade that inverts or flips phase at a 90 degree phase noise excursion. By selecting a constant envelope RF modulation format the bit error rate BER can be improved with reduced phase noise flaring over conventional optical communications systems. The embodied approach separates the optical carrier recovery from the RF subcarrier recovery, allowing low data rate signals to not be impacted by phase variations from phase noise that would normally affect a bit recovery.

A high level description of an example is given below to describe how some embodiments fit in with other optical communications systems. A typical QPSK intradyne optical communication system transmits, what is known as a complex signal, meaning that different information occurs between the upper and lower sidebands. When the signal is received the data is separated into an I (In-Phase) and a Q (Quadrature-Phase) channel. The DSBSC signal is a real signal, meaning that the same information occurs between the upper and lower sidebands. This is why the subcarrier signal will only come out of one port in the Costas loop receiver. As mentioned earlier the optical bandwidth is double for a given data rate, so to increase the data rate the QPSK signal can be formatted as an OFDM (Orthogonal Frequency Division Multiplexed) signal.

For higher sensitivity, but a lower data rate a novel FSK approach can be used that adds a QPSK (Quadrature Phase Shift Keying) modulation to each FSK tone. The novel approach is coined QPFSK (Quadrature Phase Frequency Shift Keying). The new modulation is also slightly better than an orthogonal FSK format because with QPFSK every symbol also has an antipodal symbol. With Sunde's FSK the tone separation can go as low as 1/(2Tsym) and still remain orthogonal, but with QPFSK the tone separation is 1/Tsym which is a doubling of the tone separation, but is an improvement in bandwidth because the number of tones is reduced. For 16-ary FSK there are 16 tones but with 16-ary QPFSK there are 4 tones so the bandwidth of the QPFSK signal will be approximately reduced by half. The QPFSK signal is defined below:

$$v(t) = \sin\left[2 \cdot \pi \cdot (Fsym_i + Foff) \cdot \frac{t}{Tsym} + \frac{\pi}{2} \cdot \theta sym_i\right]$$

Where Fsym is the symbol frequency number from 0, 1, 2, ..., (N−1), qsym is the the symbol phase number from 0,1,2,3, and Foff is an offset frequency number, with 1 being the lowest value. N is the number of tones and 4*N is the number of symbols.

A less bandwidth efficient, but easier to synchronize version uses sinusoidal curving, but in order to remain orthogonal has a tone separation of 2/Tsym:

$$v(t) = 2 \cdot \left|\sin\left(\frac{\pi \cdot t}{Tsym}\right)\right| \cdot \sin\left[2 \cdot \pi \cdot (2 \cdot Fsym_i + Foff) \cdot \frac{t}{Tsym} + \frac{\pi}{2} \cdot \theta sym_i\right]$$

Given an arbitrary modulated RF signal m(t), in some embodiments, the DSBSC optical signal can be described as an AM signal or a PM signal:

$$m(t) = a(t) \cdot \cos(\omega_{RF}t + \theta(t))$$

$$S_{AM}(t) = m(t) \cdot \cos(\omega_{OPT}t) =$$

$$\frac{1}{2} \cdot a(t)[\cos((\omega_{OPT} + \omega_{RF})t + \theta(t)) + \cos((\omega_{OPT} - \omega_{RF})t + \theta(t))],$$

$$m(t) = -a(t) \cdot \sin(\omega_{RF}t + \theta(t))$$

$$S_{PM}(t) = m(t) \cdot \sin(\omega_{OPT}t) =$$

$$\frac{1}{2} \cdot a(t)[\cos((\omega_{OPT} + \omega_{RF})t + \theta(t)) - \cos((\omega_{OPT} - \omega_{RF})t + \theta(t))],$$

The optical carrier recovered RF subcarrier signal will occur on the Costas loop I port if the DSBSC signal is AM and on the Q port if the DSBSC signal is PM. On either port the recovered subcarrier signal will have an Amplitude Modulation cosine term that is modulated by the optical phase noise where phi represents the phase noise of the transmit and LO laser:

$$m_I(t) = m_Q(t) = \frac{1}{2} \cdot m(t) \cdot \cos(\phi(t)).$$

The phase noise of the optical transmitter and the LO is converted into a low frequency amplitude noise that will manifest as a signal fade or a phase inversion of phase excursions beyond ±90 degrees. In some examples, a limiter can be used for PM signals to control the dynamic range. In additional or alternative embodiments a fast automatic gain control ("AGC") can be used for complex signals.

The RF modulated signal subcarrier recovery is independent of the Costas loop optical carrier recovery which uses a discriminator.

The LO feedback signal has twice the phase detection sensitivity that Costas phase lock loops ("PLL") are known to provide.

Figure 7:
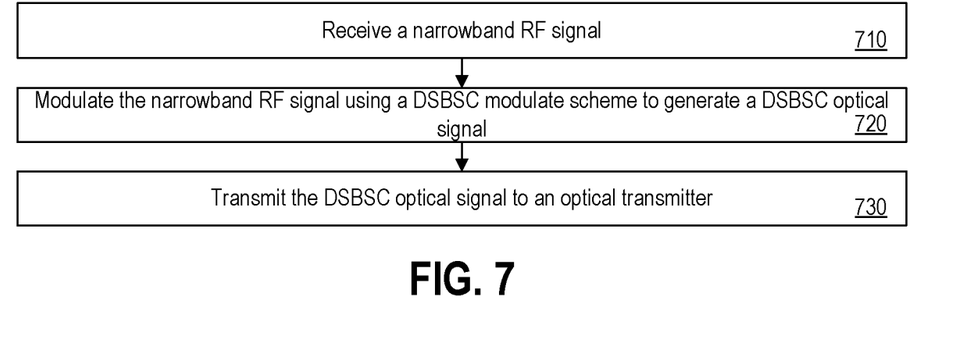
FIGS. 7-8 are flow charts illustrating examples of processes performed by an optical modulator according to some embodiments.
Figure 8:
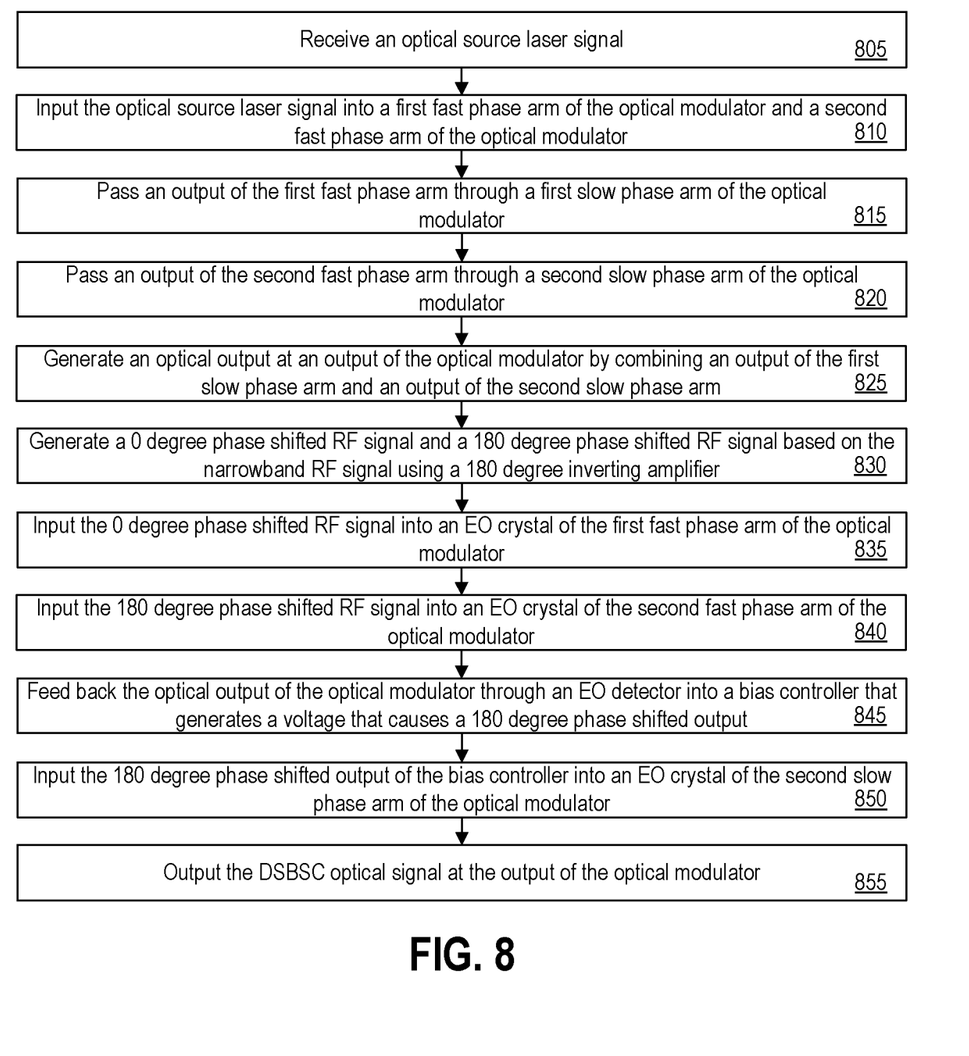

FIGS. 7-8 are flow charts illustrating examples of processes performed by a transmitter and/or optical modulator. The processes of FIGS. 7-8 are described below in reference to the optical modulator 420 of FIG. 4, however, other implementations are possible. For example the operations of FIGS. 7-8 can be performed by the DSBSC modulator 200, 300 of FIGS. 2-3. FIG. 7 illustrates an example of processes for modulating a RF signal using an optical DSBSC signal.

At block 710, optical modulator 420 receives a RF input signal 450. In some embodiments the RF signal is a narrowband phase modulated ("PM") RF signal. In additional or alternative embodiments, the RF signal is a narrowband amplitude modulated ("AM") RF signal.

At block 720, optical modulator 420 modulates the RF signal using a DSBSC modulation scheme to generate a DSBSC optical signal.

FIG. 8 illustrates an example of using the DSBSC modulation scheme to generate the DSBSC optical signal 460.

At block 805, optical modulator 420 receives an optical source laser signal. In some embodiments, the optical source laser signal is received from a source laser 410. In additional or alternative embodiments, the optical modulator 420 includes the source laser 410. The optical source laser can be input to both a first fast phase arm 422a and a second fast phase arm 422b.

At block 810, optical modulator 420 inputs the optical source laser signal into a first fast phase arm 422a of the optical modulator 420 and a second fast phase arm 422b of the optical modulator 420.

At block 815, optical modulator 420 passes an output of the first fast phase arm 422a through a first slow phase arm 424a of the optical modulator 420.

At block 820, optical modulator 420 passes an output of the second fast phase arm 422b through a second slow phase arm 424b of the optical modulator 420.

At block 825, optical modulator 420 generates an optical output at an output of the optical modulator 420 by combining an output of the first slow phase arm 424a and an output of the second slow phase arm 424b.

At block 830, optical modulator 420 optical generates a 0 degree phase shifted RF signal and a 180 degree phase shifted RF signal based on the RF signal using a 180 degree inverting amplifier 430. In some embodiments, the 180 degree inverting amplifier 430 is separate from the optical modulator 420. In additional or alternative embodiments the optical modulator 420 includes the 180 degree inverting amplifier 430. In additional or alternative embodiments, the 180 degree inverting amplifier 430 is a 180 degree hybrid amplifier.

At block 835, optical modulator 420 inputs the 0 degree phase shifted RF signal into a electro-optical ("EO") crystal of the first fast phase arm 222a of the optical modulator 420.

At block 840, optical modulator 420 inputs the 180 degree phase shifted RF signal into an EO crystal of the second fast phase arm 422b of the optical modulator 420.

At block 845, optical modulator 420 feeds back the optical output of the optical modulator through an EO detector into a bias controller 440 that generates a voltage that causes a 180 degree phase shifted output.

At block 850, optical modulator 420 inputs the 180 degree output of the bias controller 440 into an EO crystal of the second slow phase arm 424b of the optical modulator 420.

At block 855, optical modulator 420 outputs the DSBSC optical signal 260 at the output of the optical modulator 420.

Returning to FIG. 7, at block 730, the optical modulator 420 transmits the DSBSC optical signal 460 to an optical transmitter. In some embodiments, the optical modulator and optical transmitter are on a satellite in low earth orbit ("LEO") or geosynchronous orbit ("GEO").

In some embodiments the optical modulator 420 is a Mach-Zehnder modulator.

Various operations from the flow charts of FIGS. 7-8 may be optional with respect to some embodiments of optical modulators and related methods. In some embodiments, blocks 805, 810, 815, 820, 825, 830, 835, 840, 845, 850, and 855 of FIG. 8 are optional.

Figure 9:
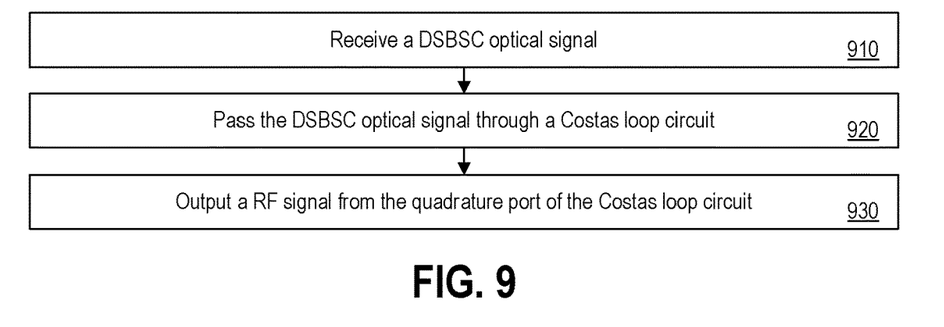
FIGS. 9-10 are flow charts illustrating examples of processes performed by an optical demodulator according to some embodiment.
Figure 10:
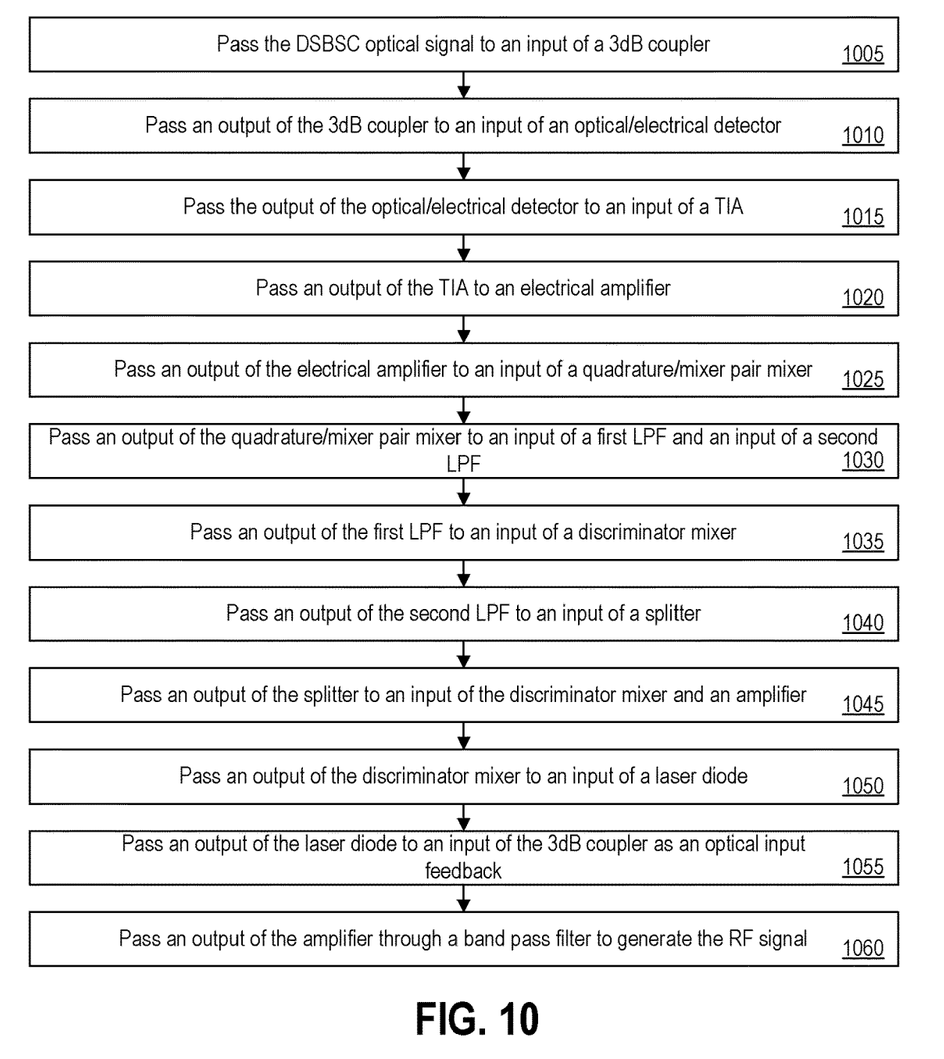

FIGS. 9-10 are flow charts illustrating examples of processes performed by an optical demodulator. The processes of FIGS. 9-10 are described below in reference to the DSBSC demodulator 500 of FIG. 5, however, other implementations are possible. FIG. 9 illustrates an example of processes for demodulating an optical DSBSC signal.

At block 910, receiver 500 receives a DSBSC optical signal. At block 915, receiver 500 passes the DSBSC optical signal through a Costas loop circuit.

FIG. 10 illustrates an example of passing the DSBSC optical signal through the Costas loop 550. At block 1005, receiver 500 passes the DSBSC optical signal to an input of a 3 dB coupler (e.g., square-law detector 512). At block 1010, receiver 500 passes an output of the 3 dB coupler to an input of an EO detector (e.g., a 90 degree optical hybrid) 520.

At block 1015, receiver 500 passes the output of the EO detector to an input of the TIA 525a-b. At block 1020, receiver 500 passes an output of the TIA 525a-b to RF electrical circuitry 530 including optical carrier recovery 530a (which can include an electrical amplifier). At block 1025, receiver 500 passes an output of the RF electrical circuitry 530 to an input of a quadrature/mixer pair mixer. At block 1030, DSBSC demodulator 530 passes an output of the quadrature/mixer pair mixer to an input of a first LPF and an input of a second LPF. At block 835, DSBSC demodulator 500 passes an output of the first LPF to an input of a discriminator. At block 1040, DSBSC demodulator 500 passes an output of the second LPF to an input of a splitter. At block 1045, DSBSC demodulator 500 passes an output of the splitter to an input of the discriminator and an amplifier. At block 1050, DSBSC demodulator 500 passes an output of the discriminator to an input of a LO laser (e.g., a laser diode) 515. At block 1055, DSBSC demodulator 500 passes an output of the laser diode to an input of the 3 dB coupler as an optical input feedback. At block 1080, DSBSC demodulator 500 passes an output of the amplifier through a BPF to generate the RF signal.

Returning to FIG. 9, at block 930, DSBSC demodulator 500 output a RF signal from the quadrature port of the RF electronic circuitry 530 (e.g., a Costas loop circuit).

Various operations from the flow charts of FIGS. 9-10 may be optional with respect to some embodiments of optical demodulators and related methods. In some embodiments, blocks 1005, 1010, 1015, 1020, 1025, 1030, 1035, 1040, 1045, 1050, 1055, 1060 of FIG. 10 are optional.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The flowchart and block diagrams in the Figures illustrate the architecture, functionality, and operation of possible implementations of systems, methods, and computer program products according to various examples of the subject disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

The invention claimed is:

1. A method of operating an optical modulator, the method comprising:
   receiving a narrowband radio frequency ("RF") signal; and
   responsive to receiving the narrowband RF signal, modulating the narrowband RF signal using a double sideband suppressed carrier ("DSBSC") modulation scheme to generate a DSBSC optical signal,
   wherein modulating the narrowband RF signal further comprising;
      inputting an optical source laser signal into a first fast phase arm of the optical modulator and a second fast phase arm of the optical modulator;
      passing an output of the first fast phase arm through a first slow phase arm of the optical modulator;
      passing an output of the second fast phase arm through a second slow phase arm of the optical modulator; and
      generating an optical output at an output of the optical modulator by combining an output of the first slow phase arm and an output of the second slow phase arm.

2. The method of claim 1, wherein modulating the narrowband RF signal to generate the DSBSC optical signal further comprises:
   receiving the optical source laser signal.

3. The method of claim 1, wherein modulating the narrowband RF signal to generate the DSBSC optical signal further comprises:
   generating a 0 degree phase shifted RF signal and a 180 degree phase shifted RF signal based on the narrowband RF signal using a 180 degree inverting amplifier;

inputting the 0 degree phase shifted RF signal into an electro-optical ("EO") crystal of the first fast phase arm of the optical modulator; and inputting the 180 degree phase shifted RF signal into an EO crystal of the second fast phase arm of the optical modulator.

4. The method of claim 3, wherein modulating the narrowband RF signal to generate the DSBSC optical signal further comprises:

feeding back the optical output of the optical modulator through an EO detector into a bias controller that generates a voltage that causes a 180 degree phase shifted output;

inputting the 180 degree phase shifted output of the bias controller into an EO crystal of the second slow phase arm; and outputting the DSBSC optical signal at the output of the optical modulator.

5. The method of claim 4, wherein the optical modulator is a Mach-Zehnder modulator.

6. The method of claim 1, wherein the narrowband RF signal is a narrowband phase modulated ("PM") RF signal.

7. The method of claim 1, wherein the narrowband RF signal is a narrowband amplitude modulated ("AM") RF signal.

8. The method of claim 1, wherein the optical modulator and optical transmitter are on a satellite in low earth orbit ("LEO") or geosynchronous orbit ("GEO").

9. The method of claim 1, wherein the optical modulator is separate from an optical transmitter, the method further comprising:
transmitting the DSBSC optical signal to the optical transmitter.

10. The method of claim 1, wherein the optical modulator is included in an optical transmitter, the method further comprising:
transmitting the DSBSC optical signal to at least one of:
a receiver via an optical fiber; and
an optical telescope system.

11. An optical modulator comprising:
an input port configured to receive a narrowband radio frequency ("RF") signal;
an output port configured to output a double sideband suppressed carrier ("DSBSC") signal; and
circuitry configured to modulate the narrowband RF signal using a DSBSC modulation scheme to generate a DSBSC optical signal, the circuitry comprising:
a first fast phase arm;
a second fast phase arm;
a first slow phase arm having an input coupled to an output of the first fast phase arm; and
a second slow phase arm having an input coupled to an output of the second fast phase arm,
wherein the output port is coupled to an output of the first slow phase arm and the second slow phase arm and further configured to generate an optical output by combining a first signal output by the first slow phase arm and a second signal output by the second slow phase arm.

12. The optical modulator of claim 11, wherein the circuitry further comprises:
an optical laser signal source having an output coupled to an input of the first phase arm and an input of the second phase arm, the optical laser signal source configured to input an optical source laser signal into the first fast phase arm and into the second fast phase arm.

13. The optical modulator of claim 11, wherein the circuitry further comprises:
a 180 degree inverting amplifier including an input coupled to the input port of the optical modulator and configured to generate a 0 degree phase shifted RF signal at a first output based on the narrowband RF signal and a 180 degree phase shifted RF signal at a second output based on the narrowband RF signal,
wherein the first fast phase arm includes an EO crystal coupled to the first output of the 180 degree inverting amplifier, and
wherein the second fast phase arm includes an EO crystal coupled to the second output of the 180 degree inverting amplifier.

14. The optical modulator of claim 13, wherein the circuitry further comprises:
an EO detector including an input coupled to the output port; and
a bias controller including an input coupled to an output of the EO detector and configured to phase shift a signal at the output of the EO detector by 180 degrees,
wherein an EO crystal of the second slow phase arm is coupled to an output of the bias controller.

15. The optical modulator of claim 11, wherein the optical modulator is a Mach-Zehnder modulator.

16. The optical modulator of claim 11, wherein the narrowband RF signal is a narrowband phase modulated ("PM") RF signal.

17. The optical modulator of claim 11, wherein the narrowband RF signal is a narrowband amplitude modulated ("AM") RF signal.

18. The optical modulator of claim 11, wherein the optical modulator and optical transmitter are on a satellite in low earth orbit ("LEO") or geosynchronous orbit ("GEO").

19. The optical modulator of claim 11, wherein the optical modulator is separate from the optical transmitter, and
wherein the circuitry is further configured to transmit the DSBSC optical signal to an optical transmitter.

20. The optical modulator of claim 11, wherein the optical modulator is included in an optical transmitter, and
wherein the circuitry is further configured to transmit the DSBSC optical signal to at least one of:
a receiver via an optical fiber; and
an optical telescope system.

* * * * *